(12) United States Patent
Jones et al.

(10) Patent No.: US 6,514,593 B1
(45) Date of Patent: Feb. 4, 2003

(54) MECHANICALLY LOCKING Z-PINS

(75) Inventors: Steven R. Jones, Newberry Park, CA (US); Howard A. King, Rancho Palos Verdes, CA (US); Joseph T. Salehi, Westlake Village, CA (US); John P. Kern, Redondo Beach, CA (US); George Rodgers, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/378,906

(22) Filed: Aug. 23, 1999

(51) Int. Cl.[7] .................................................. B32B 3/06
(52) U.S. Cl. .................... 428/100; 428/100; 428/367; 411/82; 411/82.1; 411/500; 411/504
(58) Field of Search .................................. 428/367, 100; 411/82, 82.1, 500, 504

(56) References Cited

U.S. PATENT DOCUMENTS

| | | | | |
|---|---|---|---|---|
| 2,171,530 A | * | 9/1939 | Balfe | 154/2 |
| 2,463,185 A | * | 3/1949 | Kremer | 85/5 |
| 4,978,270 A | * | 12/1990 | Ackerman | 411/511 |
| 5,466,506 A | * | 11/1995 | Freitas et al. | 428/105 |
| 5,789,061 A | * | 8/1998 | Campbell et al. | 428/119 |
| 5,862,975 A | * | 1/1999 | Childress | 228/120 |
| 5,876,832 A | * | 3/1999 | Pannell | 428/119 |

* cited by examiner

*Primary Examiner*—Harold Pyon
*Assistant Examiner*—Marc Patterson
(74) *Attorney, Agent, or Firm*—Stetina Brunda Garred & Brucker

(57) ABSTRACT

A pin for Z-pinning at least two composite material layers to each other which comprises generally circular first and second ends of first and second diameters, respectively. Extending between the first and second ends is a central portion defining at least two radially extending flange sections which are each of a diameter exceeding the larger of the first and second diameters. In an alternative embodiment, the pin comprises generally circular first and second ends which are of first and second diameters, respectively. Extending between the first and second ends in the second embodiment is a central portion defining a generally hyperboloidal outer surface having a maximum diameter which does not exceed the smaller of the first and second diameters.

31 Claims, 1 Drawing Sheet

MECHANICALLY LOCKING Z-PINS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to the Z-pinning of composite material layers to each other, and more particularly to uniquely configured Z-pins for use in a Z-pinning process to achieve a mechanical lock between the layers and maximize the bond strength between the layers and the Z-pins.

As is known in the prior art, structural composites such as structural composite airframes typically comprise multiple composite stiffeners or stiffener members which are attached or fastened to prescribed areas of a composite substrate such as the aircraft skin. One such commonly used stiffener is referred to as a "hat stiffener" due to its shape. These composite hat stiffeners or other aircraft stiffeners are often used to reinforce thin composite structures such as wing and fuselage skins and bulkhead webs. In this respect, the purpose of such stiffeners is to supply rigidity and stiffness to the airframe of the aircraft as is required under certain flight load conditions. The stiffener must be attached to the skin in a manner wherein shear loads and out-of-plain loads due to peel (delamination) are transferred thereto.

Currently, numerous processes or techniques are employed to facilitate the attachment or fastening of a stiffener to an aircraft skin or other composite structure or substrate. More particularly, current practices include either co-curing, adhesively bonding, or mechanically fastening the stiffener to the skin. Though the co-curing and adhesive bonding techniques offer the minimum weight solution, the reliability of co-cured and adhesive bonded joints is generally low. Additionally, though mechanically fastened joints (e.g., bolts and rivets) have been successfully used in the prior art, the use of such mechanical joints requires that the laminate be reinforced so that it can react to bolt bearing loads. Further, the fasteners themselves are very heavy and expensive, with the cost of installation and inspection resulting in a high cost per fastener. As such, when one composite part is attached to another composite part through the use of bolts and/or rivets, such fasteners add weight, increase fabrication cost, and often contribute to local failure modes between the individual plies of the laminate composite.

In order to alleviate the above-described problems, a process referred to as "Z-pinning" has been developed in the prior art to facilitate the attachment of one composite layer or component, such as an aircraft stiffener or hat stiffener, to another composite layer or component/substrate, such as an aircraft skin. In the Z-pinning process, reinforcing pins or fibers are inserted at a radius region of the stiffener into the skin to increase the initial failure load of the joint between the stiffener and the skin, or through a flange portion of the stiffener and into the skin to resist crack propagation. In addition, the pins or fibers reinforce the individual plies of both the stiffener and the skin to resist delamination.

The insertion of the pins or fibers may be accomplished by softening the composite stiffener and skin, and thereafter driving multiple pins or fibers through the stiffener and into the skin through the use of, for example, an autoclave press, an ultrasonic transducer, or a hand-held pinning tool. When an ultrasonic transducer is employed, the resultant high frequency vibration of the pins or fibers results in the same being forced through the stiffener and into the skin. Irrespective of the particular device used to facilitate the insertion of the pins or fibers through the stiffener and into the skin, the pins or fibers are typically embedded in a transfer material for purposes of maintaining the same in prescribed orientations relative to each other and relative to that portion of the stiffener through which they are advanced. As indicated above, the advancement of the pins or fibers through the stiffener and into the skin effectively increases the initial failure load of the joint therebetween.

Though, as discussed above, the Z-pinning process provides advantages over the use of co-curing, adhesive bonding, or mechanical fastening, the pins or fibers themselves possess certain deficiencies which detract from their overall utility. More particularly, the prior art Z-pins are typically cylindrically configured with opposed beveled ends. The fibers, like the pins, also have generally circular cross-sectional configurations of substantially constant diameter. As will be recognized, in view of the shapes (i.e., uniform diameters) of the prior art Z-pins and fibers, they do not facilitate the mechanical lock or retention between the joined panels or layers (e.g., the stiffener and skin). Since they are of a constant diameter, only the bond strength between the composite material layers and the Z-pins or fibers themselves resists the movement of the layer(s) along an axis which is parallel or coaxially aligned with the axis of the Z-pin or fiber. Additionally, the shapes of such prior art Z-pins and fibers result in the same defining a relatively low surface area to which the composite materials of the stiffener and skin may be bonded. Due to the inability of the prior art Z-pins and fibers to mechanically lock the layers to each other, the integrity of the joint between the layers is dependent upon the strength of adhesion between the composite materials of the layers to the surface or bond area defined by the Z-pins or fibers, with a reduced surface area therefore resulting in an increased susceptibility to joint failure.

The present invention overcomes these deficiencies with prior art Z-pins and fibers used in a Z-pinning process by providing Z-pins which are uniquely configured to provide an increased surface or bond area over those known in the prior art, and further to facilitate the mechanical locking or retention of the joined composite material panels or layers to each other. As will be described below, the Z-pins of the present invention are provided with varying diameters, thus providing numerous advantages over the prior art Z-pins and fibers which, due to their constant or uniform diameters as explained above, do not provide the mechanical lock achieved by the Z-pins of the present invention or the enhanced bonding resulting from the increased surface area of the present Z-pins.

BRIEF SUMMARY OF THE INVENTION

In accordance with a first embodiment of the present invention, there is provided a pin for Z-pinning at least two composite material layers to each other which comprises a generally circular first end having a first diameter and a generally circular second end having a second diameter. Extending between the first and second ends is a cylindrically configured central portion which defines at least two, and preferably three, radially extending flange sections which are spaced at substantially equidistant intervals between the first and second ends. The flange sections are each preferably of a diameter exceeding the larger of the first and second diameters. In the first embodiment, the first and second diameters are preferably substantially equal, as are the diameters of the flange sections which each preferably include an arcuately contoured peripheral edge. Additionally, the first and second ends and the central portion of the pin are preferably in coaxial alignment with each other. The pin may be fabricated from a metallic material or a composite material such as resin impregnated graphite or fiberglass materials.

In accordance with a second embodiment of the present invention, there is provided a pin for Z-pinning at least two composite material layers to each other which comprises a generally circular first end having a first diameter and a generally circular second end having a second diameter. Extending between the first and second ends is a central portion which defines a generally hyperboloidal outer surface having a maximum diameter which does not exceed the smaller of the first and second diameters. In the second embodiment, the first and second diameters are preferably substantially equal, with the first and second ends and the central portion preferably being in coaxial alignment with each other. The pin in the second embodiment may also be fabricated from a metallic material or a composite material such as a resin impregnated graphite or fiberglass material.

In accordance with a third embodiment of the present invention, there is provided a pin which constitutes a modified version of the pin of the first embodiment. The pin of the third embodiment comprises a generally oval first end having a first maximum width and a generally oval second end having a second maximum width. Extending between the first and second ends is a central portion which defines at least two, and preferably three, generally oval flange sections which are spaced at substantially equidistant intervals between the first and second ends and each have a maximum width exceeding the larger of the first and second maximum widths. The central portion of the pin defines an outer surface having at least one groove formed therein which extends from the first end to the second end.

In accordance with a fourth embodiment of the present invention, there is provided a pin which constitutes a modified version of the pin of the second embodiment. The pin of the fourth embodiment comprises a generally oval first end having a first maximum width and a generally oval second end having a second maximum width. Extending between the first and second ends is a central portion which defines a generally hyperboloidal outer surface having a maximum width which does not exceed the smaller of the first and second maximum widths. In the fourth embodiment, the outer surface of the central portion of the pin includes at least one groove formed therein which extends from the first end to the second end.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
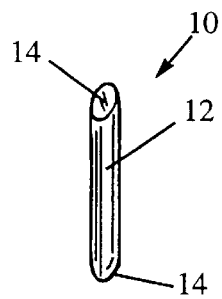
FIG. 1 is a top perspective view of a prior art pin for use in Z-pinning applications.

Referring now to the drawings wherein the showings are for purposes of illustrating preferred embodiments of the present invention only, and not for purposes of limiting the same, FIG. 1 perspectively illustrates a Z-pin 10 currently known in the prior art and frequently employed in Z-pinning processes. The prior art Z-pin 10 comprises a cylindrically configured body portion 12 having opposed beveled ends 14. The body portion 12 has a circular cross-sectional configuration, and is of a constant or uniform diameter. As indicated above, the prior art Z-pin 10 is deficient in that when the same is employed in a Z-pinning process, its uniform diameter does not facilitate the mechanical lock or retention between the joined panels or layers (e.g., a stiffener and skin in a composite air-frame). In this respect, since the Z-pin 10 is of a constant diameter, only the bond strength between the composite material layers and the Z-pin 10 resists the movement of the layer(s) along an axis which is parallel or coaxially aligned with the axis of the Z-pin 10 when the same is inserted into an extends between the layers. Additionally, the uniform diameter of the Z-pin 10 results in the same defining a relatively low surface area to which the composite materials of the joined layers may be bonded.

Figure 2:
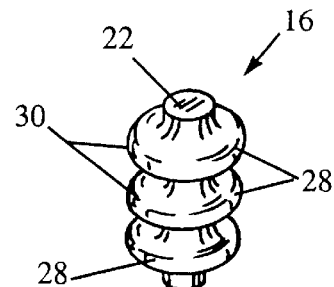
FIG. 2 is a top perspective view of a pin for use in Z-pinning applications formed in accordance with a first embodiment of the present invention.
Figure 3:
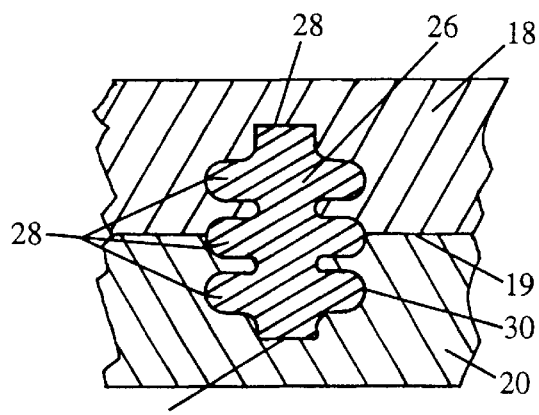
FIG. 3 is a partial cross-sectional view illustrating the manner in which the pin shown in FIG. 2 is used for Z-pinning two composite material layers to each other.

Referring now to FIGS. 2 and 3, there is depicted a Z-pin 16 constructed in accordance with a first embodiment of the present invention. As will be described in more detail below, the Z-pin 16 is used in a Z-pinning process to attach or fasten first and second composite material layers 18, 20 to each other in the manner shown in FIG. 3.

In the first embodiment, the Z-pin 16 comprises a generally circular first end 22 having a first diameter, and a generally circular second end 24 having a second diameter. Extending between the first and second ends 22, 24 is a cylindrically configured central portion 26 which defines at least two, and preferably three, radially extending flange sections 28 which are preferably spaced in substantially equidistant intervals between the first and second ends 22, 24. Those of ordinary skill in the art will recognize that the central portion 26 may be provided with a greater length then that shown in FIGS. 2 and 3, and with more than three flange sections 28. The flange sections 28 are each preferably of a diameter exceeding the larger of the first and second diameters of the first and second ends 22, 24, respectively. In the first embodiment, the first and second diameters of the first and second ends 22, 24 are preferably substantially equal, as are the diameters of the flange sections 28. The flange sections 28 each preferably include an arcuately contoured peripheral edge 30, though it will be recognized that such peripheral edge 30 may have alternative configurations such as a pointed or wedge-shaped configuration. Additionally, the first and second ends 22, 24 and the central portion 26 of the Z-pin 16 are preferably in coaxial alignment with each other.

In the first embodiment, it is contemplated that the Z-pin 16 may be fabricated from a metallic material or alternatively from a polymer material or a composite material such as a resin impregnated graphite or fiberglass material. Acceptable metallic materials for the Z-pin 16 include all common metals such as, but not limited to, aluminum, titanium, steels, etc., and exotic metals (e.g., metal and ceramic matrix reinforced engineering materials) If fabricated from a metallic material, the Z-pin 16 will typically be formed through either a rolling, pressing, forging, sintering, machining, casting, or fused deposition technology process. If fabricated from a composite material, the Z-pin 16 may be formed by an epoxy composite material including twisted or braided graphite or fiberglass fibers which are embedded therein. Other suitable composite materials include reinforced thermoplastic and thermoset resins and reinforced and non-reinforced engineering plastics. In addition to graphite or fiberglass fibers, other suitable reinforcement materials include, but are not limited to, kevlars, boron, nylons, and polyesters. Additionally, various manufacturing methods may be employed to form the polymer material or composite material Z-pin 16 including, but not limited to, injection molding, compression molding, rotational molding, resin transfer molding, resin infusion molding, and fused deposition technology. Rather than being fabricated from a metallic material or a composite material, it is further contemplated that the Z-pin 16 may be fabricated from a ceramic material.

As seen in FIG. 3 and as explained above, the insertion of the Z-pin 16 into the first and second layers 18, 20 may be accomplished by softening the first and second layers 18, 20 and thereafter driving the Z-pin 16 through the first layer 18 and partially into the second layer 20 through the use of, for example, an autoclave press, an ultrasonic transducer, or a hand-held pinning tool. When properly advanced into the first and second layers 18, 20, at least one of the flange sections 28 of the Z-pin 16 is embedded within the first layer 18, with one of the flange sections 28 being embedded in the second layer 20. In FIG. 3, a flange section 28 is shown as being disposed at the joint 19 between the first and second layers 18, 20, though it will be recognized that the joint 19 may be disposed between adjacent flange sections 28 of the Z-pin 16. Advantageously, the non-uniform diameter of the Z-pin 16 attributable to its inclusion of the flange sections 28 results in the first and second layers 18, 20 being mechanically locked to each other once fully cured with the Z-pin 16 embedded therein in the aforementioned manner. Additionally, the increased surface area of the Z-pin 16 attributable to its inclusion of the flange sections 28 facilitates an increase in the bond area to which the composite material of the first and second layers 18, 20 may be bonded, thus further strengthening the joint 19 therebetween.

Figure 4:
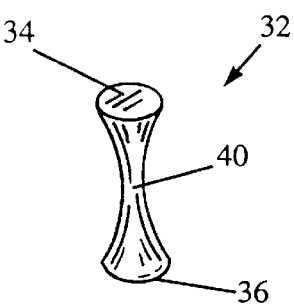
FIG. 4 is a top perspective view of a pin for use in Z-pinning applications formed in accordance with a second embodiment of the present invention.
Figure 5:
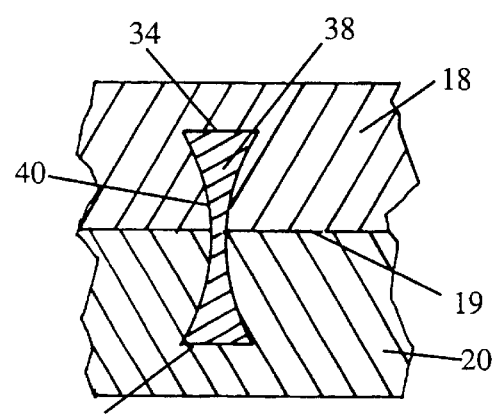
FIG. 5 is a partial cross-sectional view illustrating the manner in which the pin shown in FIG. 4 is used for Z-pinning two composite material layers to each other.

Referring now to FIGS. 4 and 5, there is depicted a Z-pin 32 constructed in accordance with a second embodiment of the present invention. Like the Z-pin 16 of the first embodiment, the Z-pin 32 of the second embodiment is adapted for use in a Z-pinning process to attach or fasten the first and second layers 18, 20 to each other in the manner shown in FIG. 5. The Z-pin 32 comprises a generally circular first end 34 having a first diameter, and a generally circular second end 36 having a second diameter. Extending between the first and second ends 34, 36 is a central portion 38 which defines a generally hyperboloidal outer surface 40 having a maximum diameter which does not exceed the smaller of the first and second diameters of the first and second ends 34, 36, respectfully.

In the Z-pin 32 of the second embodiment, the first and second diameters of the first and second ends 34, 36 are preferably substantially equal, with the first and second ends 34, 36 and the central portion 38 preferably being in coaxial alignment with each other. As with the Z-pin 16 of the first embodiment, the Z-pin 32 of the second embodiment may be fabricated from a metallic material or alternatively from a polymer material or a composite material such as a resin impregnated graphite or fiberglass material. Acceptable metallic materials for the Z-pin 32 include all common metals such as, but not limited to, aluminum, titanium, steels, etc., and exotic metals (e.g., metal and ceramic matrix reinforced engineering materials) If fabricated from a metallic material, the Z-pin 32 will typically be formed through either a rolling, pressing, forging, sintering, machining, casting, or fused deposition technology process. If fabricated from a composite material, the Z-pin 32 may be formed by an epoxy composite material including twisted or braided graphite or fiberglass fibers which are embedded therein. Other suitable composite materials include reinforced thermoplastic and thermoset resins and reinforced and non-reinforced engineering plastics. In addition to graphite or fiberglass fibers, other suitable reinforcement materials include, but are not limited to, kevlars, boron, nylons, and polyesters. Additionally, various manufacturing methods may be employed to form the polymer material or composite material Z-pin 32 including, but not limited to, injection molding, compression molding, rotational molding, resin transfer molding, resin infusion molding, and fused deposition technology. Rather than being fabricated from a metallic material or a composite material, it is further contemplated that the Z-pin 32 may be fabricated from a ceramic material.

The insertion of the Z-pin 32 into the first and second layers 18, 20 may also be accomplished by softening the first and second layers 18, 20 and thereafter driving the Z-pin 32 through the first layer 18 and partially into the second layer 20. When properly advanced into the first and second layers 18, 20, the first end 34 of the Z-pin 32 will be embedded within one of the first and second layers 18, 20, with the second end 36 of the Z-pin 32 being embedded in the remaining layer. Additionally, the joint 19 defined between the first and second layers 18, 20 will preferably extend approximately intermediate the first and second ends 34, 36 of the Z-pin 32 (i.e., at the approximate center of the central portion 38 which is of the smallest diameter).

The Z-pin 32, when used in a Z-pinning process to attach the first and second layers 18, 20 to each other, provides the same advantages previously described in relation to the Z-pin 16 of the first embodiment. More particularly, due to the diameters of the first and second ends 34, 36 of the Z-pin 32 substantially exceeding that of the approximate center of the central portion 38 thereof, the insertion of the Z-pin 32 through the first layer 18 and partially into the second layer 20 mechanically locks the first and second layers 18, 20 to each other. The configuration of the Z-pin 32 also provides an increased surface or bond area to which the composite materials of the first and second layers 18, 20 may be adhered.

Figure 6:
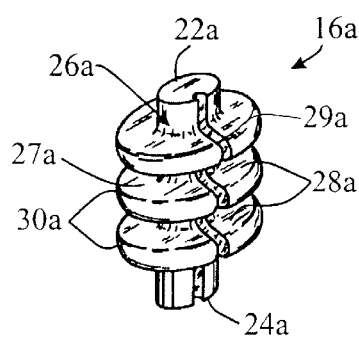
FIG. 6 is a top perspective view of a pin for use in Z-pinning applications formed in accordance with a third embodiment of the present invention which constitutes a modified version of the first embodiment.

Referring now to FIG. 6, there is depicted a Z-pin 16a formed in accordance with a third embodiment of the present invention which constitutes a modified version of the Z-pin 16 of the first embodiment. The Z-pin 16a comprises a generally oval first end 22a having a first maximum width, and a generally oval second end 24a having a second maximum width. Extending between the first and second ends 22a, 24a is a central portion 26a which defines at least two, and preferably three, outwardly extending, generally oval flange sections 28a which are preferably spaced in substantially equidistant intervals between the first and second ends 22a, 24a. Those of ordinary skill in the art will recognize that the central portion 26a may be provided with a greater length than that shown in FIG. 6, and with more than three flange sections 28a. The flange sections 28a are each preferably of a maximum width exceeding the larger of the first and second maximum widths of the first and second ends 22a, 24a, respectively. In the third embodiment, the first and second maximum widths of the first and second ends 22a, 24a are preferably substantially equal, as are the maximum widths of the flange sections 28a. The flange sections 28a each preferably include an arcuately contoured peripheral edge 30a, though it will be recognized that such peripheral edge 30a may have alternative configurations such as a pointed or wedge-shaped configuration. Additionally, the first and second ends 22a, 24a and the central portion 26a of the Z-pin 16a are preferably in coaxial alignment with each other.

In the third embodiment, it is contemplated that the Z-pin 16 may be fabricated from the same materials and in accordance with the same processes/techniques as previously described in relation to the Z-pin 16 of the first embodiment. Additionally, the insertion of the Z-pin 16a into the first and second layers 18, 20 may be accomplished in the same manner previously described in relation to the first embodiment.

As further seen in FIG. 6, in the Z-pin 16a of the third embodiment, the central portion 26a defines an outer surface 27a having a flute or groove 29a formed therein which extends from the first end 22a to the second 24a. The groove 29a extends longitudinally along the outer surface 27a. Advantageously, when the Z-pin 16a is inserted into the first and second layers 18, 20, the groove 29a provides a channel or conduit for venting gases that may either become entrapped or are produced during the cure cycle. Additionally, the Z-pin 16a of the third embodiment provides the same advantages previously described in relation to the Z-pin 16, with the additional advantage of being able to mechanically resist rotational forces due to the oval shape of the minor and major diameters thereof. Those of ordinary skill in the art will recognize that the Z-pin 16a may be provided with multiple grooves 29a, and that the groove(s) 29a may also be provided in the Z-pin 16 of the first embodiment.

Figure 7:
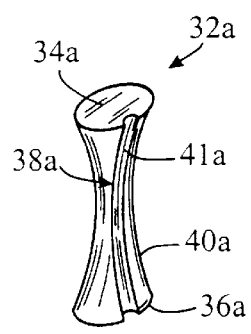
FIG. 7 is a top perspective view of a pin for use in Z-pinning applications formed in accordance with a fourth embodiment of the present invention which constitutes a modified version of the second embodiment.

Referring now to FIG. 7, there is depicted a Z-pin 32a constructed in accordance with a fourth embodiment of the present invention which constitutes a modified version of the Z-pin 32 of the second embodiment. The Z-pin 32a comprises a generally oval first end 34a having a first maximum width, and a generally oval second end 36a having a second maximum width. Extending between the first and second ends 34a, 36a is a central portion 38a which has a generally oval cross-sectional configuration and defines a generally hyperboloidal outer surface 40a having a maximum width which does not exceed the smaller of the first and second maximum widths of the first and second ends 34a, 36a, respectively.

In the Z-pin 32a of the fourth embodiment, the first and second maximum widths of the first and second ends 34a, 36a are preferably substantially equal, with the first and second ends 34a, 36a and the central portion 38a preferably being in coaxial alignment with each other. The Z-pin 32a may also be fabricated from the same materials in accordance with the same processes/techniques previously described in relation to the Z-pin 32 of the second embodiment. Additionally, the insertion of the Z-pin 32a into the first and second layers 18, 20 may be accomplished in the same manner previously described in relation to the Z-pin 32 of the second embodiment.

As further seen in FIG. 7, formed in the outer surface 40a of the Z-pin 32a is an elongate flute or groove 41a which extends from the first end 34a to the second end 36a. The groove 41a extends longitudinally along the outer surface 40a. In the Z-pin 32a, the groove 41a provides the same function as the groove 29a previously described in relation to the Z-pin 16a, i.e., to vent gases that may either become entrapped or produced during the cure cycle of the first and second layers 18, 20. In addition to providing the same advantages previously described in relation to the Z-pin 32 of the second embodiment, the Z-pin 32a also provides the additional advantage of mechanically resisting rotational forces due to the oval shape of the major and minor diameters thereof. Those of ordinary skill in the art will further recognize that the Z-pin 32a may be provided with more than one groove 41a, and that the groove(s) 41a may also be formed in the Z-pin 32 of the second embodiment.

In the Z-pins 16, 16a, 32, 32a constructed in accordance with any embodiment of the present invention, prudent engineering design and analysis will identify and define the location and variation of minor and major diameter, whether circularly configured or oval, the length of the central portions 26, 26a, 38, 38a, and the number and spacing of flange sections 28, 28a to best suit the particular load conditions. Such engineering is preferably accomplished through the use of FEA or similar type analysis to tailor the Z-pins 16, 16a, 32, 32a to react to either local or zoned loading conditions. In this respect, it is contemplated that the minor diameter of the Z-pins 16, 16a, 32, 32a will always be tailored or tapered to suit specific loading requirements. Additionally, it is further contemplated that the Z-pins 16, 16a, 32, 32a may be formed to include hollow cores or cylinders at the central axis or axis of rotation for purposes of facilitating a weight reduction.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A pin for Z-pinning at least two composite material layers to each other, the pin comprising:

a circular first end having a first diameter;

a circular second end having a second diameter; and a central portion extending between the first and second ends and defining at least two radially extending flange sections which are each of a diameter exceeding the larger of the first and second diameters;

wherein the outer surface of the central portion includes at least on groove formed therein which extends from the first end to the second end.

2. The pin of claim 1 wherein the first and second diameters are equal.

3. The pin of claim 1 wherein the central portion defines three flange sections.

4. The pin of claim 3 wherein the flange sections are spaced at equidistant intervals between the first and second ends.

5. The pin of claim 1 wherein the diameters of the flange sections are equal.

6. The pin of claim 1 wherein each of the flange sections includes an arcuately contoured peripheral edge.

7. The pin of claim 1 wherein the pin is fabricated from a metallic material.

8. The pin of claim 1 wherein the pin is fabricated from a composite material.

9. The pin of claim 8 wherein the composite material is selected from the group consisting of:
   a resin impregnated graphite material; and
   a resin impregnated fiberglass material.

10. The pin of claim 1 wherein the first and second ends and the central portion are coaxially aligned.

11. A pin for Z-pinning at least two composite material layers to each other, the pin comprising:
    a circular first end having a first diameter;
    a circular second end having a second diameter; and
    a central portion extending between the first and second ends, the central portion having a length at least as great as the sum of the first and second diameters, and defining a hyperboloidal outer surface having a maximum diameter which does not exceed the smaller of the first and second diameters;
    wherein the outer surface of the central portion includes at least on groove formed therein which extends from the first end to the second end.

12. The pin of claim 11 wherein the first and second diameters are equal.

13. The pin of claim 11 wherein the pin is fabricated from a metallic material.

14. The pin of claim 11 wherein the pin is fabricated from a composite material.

15. The pin of claim 14 wherein the composite material is selected from the group consisting of:
    a resin impregnated graphite material; and
    a resin impregnated fiberglass material.

16. The pin of claim 11 wherein the first and second ends and the central portion are coaxially aligned.

17. A pin for Z-pinning at least two composite material layers to each other, the pin comprising:
    an oval first end having a first maximum width;
    an oval second end having a second maximum width; and
    a central portion extending between the first and second ends and defining at least two outwardly extending, generally oval flange sections which are each of a maximum width exceeding the larger of the first and second maximum widths;
    wherein the central portion defines an outer surface having at least one groove formed therein which extends from the first end to the second end.

18. The pin of claim 17 wherein the central portion defines three flange sections.

19. The pin of claim 18 wherein the flange sections are spaced at equidistant intervals between the first and second ends.

20. The pin of claim 17 wherein each of the flange sections includes an arcuately contoured peripheral edge.

21. The pin of claim 17 wherein the pin is fabricated from a metallic material.

22. The pin of claim 17 wherein the pin is fabricated from a composite material.

23. The pin of claim 22 wherein the composite material is selected from the group consisting of:
    a resin impregnated graphite material; and
    a resin impregnated fiberglass material.

24. The pin of claim 17 wherein the first and second ends and the central portion are coaxially aligned.

25. A pin for Z-pinning at least two composite material layers to each other, the pin comprising:
    an oval first end having a first maximum width;
    an oval second end having a second maximum width; and
    a central portion extending between the first and second ends and defining a hyperboloidal outer surface having a maximum width which does not exceed the smaller of the first and second maximum widths;
    wherein the outer surface of the central portion includes at least on groove formed therein which extends from the first end to the second end.

26. The pin of claim 25 wherein the pin is fabricated from a metallic material.

27. The pin of claim 25 wherein the pin is fabricated from a composite material.

28. The pin of claim 27 wherein the composite material is selected from the group consisting of:
    a resin impregnated graphite material; and
    a resin impregnated fiberglass material.

29. The pin of claim 25 wherein the first and second ends and the central portion are coaxially aligned.

30. A pin for Z-pinning at least two composite material layers to each other, the pin comprising:
    a circular first end having a first diameter;
    a circular second end having a second diameter; and
    a central portion extending between the first and second ends and including at least two outwardly extending flange sections which are each of a diameter exceeding the larger of the first and second diameters, the central portion defining an outer surface having at least on groove formed therein which extends from the first end to the second end.

31. A pin for Z-pinning at least two composite material layers to each other, the pin comprising:
    a first end having a first maximum width;
    a second end having a second maximum width; and
    a central portion extending between the first and second ends and defining a hyperboloidal outer surface having a maximum width which does not exceed the smaller of the first and second maximum widths, the outer surface including at least one groove formed therein which extends from the first end to the second end.

* * * * *